United States Patent [19]

Messing

[11] 3,839,154

[45] Oct. 1, 1974

[54] APPARATUS AND METHOD FOR MEASURING CONDUCTIVITY CHANGE IN A GLUCOSE-GLUCOSE OXIDASE REACTION

[75] Inventor: Ralph A. Messing, Horseheads, N.Y.

[73] Assignee: Corning Glass Works, Corning, N.Y.

[22] Filed: Aug. 20, 1973

[21] Appl. No.: 390,005

[52] U.S. Cl............ 195/103.5 C, 195/127, 195/63, 195/DIG. 11
[51] Int. Cl. .......................................... G01n 31/14
[58] Field of Search....... 195/103.5 R, 127, DIG. 11

[56] References Cited
UNITED STATES PATENTS 3,635,681  1/1974  Rogers ........................ 195/103.5 R
3,788,950  1/1974  Hicks et al. ................. 195/103.5 C

*Primary Examiner*—Alvin E. Tanenholtz
*Attorney, Agent, or Firm*—James A. Giblin; Clarence R. Patty, Jr.

[57] ABSTRACT

Changes in the electrical conductivity of a solution containing the reaction products of a glucose-glucose oxidase reaction can be continuously monitored without interference from the enzyme by passing a glucose solution through a column containing glucose oxidase and catalase immobilized on and within porous inorganic carrier materials, measuring the conductivity of the solution after passage through the column, and comparing that conductivity with the conductivity of the glucose solution before passage through the column or the conductivity of a standard glucose solution.

5 Claims, 2 Drawing Figures

PATENTED OCT 1 1974　　3,839,154

DIFFERENTIAL CONDUCTIVITY RECORDING USING IMMOBILIZED GLUCOSE OXIDASE AND CATALASE

APPARATUS AND METHOD FOR MEASURING CONDUCTIVITY CHANGE IN A GLUCOSE-GLUCOSE OXIDASE REACTION

RELATED APPLICATION

Patent application Ser. No. 332,804 filed Feb. 16, 1973 in the name of R. A. Messing, entitled "Synergistic Enzymes Adsorbed Within Porous Inorganic Carriers," and assigned to the present assignee.

BACKGROUND OF THE INVENTION

1. Field

This invention relates generally to an apparatus which measures the difference in electrical conductivity between two solutions, one of the solutions containing the products of an enzymatic reaction. Specifically, the invention relates to an apparatus and method for continuously monitoring conductivity changes attributable to a glucose-glucose oxidase reaction in which the glucose oxidase is immobilized within porous inorganic carriers and kept separate from the reaction product solution.

2. Prior Art

It is well known that changes in the electrical conductivity of an ionic reaction solution can be used for quantitative chemical determinations. In an enzyme-substrate reaction, such observed changes in electrical conductivity can be used to quantitate substrate concentration or enzyme activity. See, for example, U.S. Pat. No. 3,421,982 issued to Schultz et al. on Jan. 14, 1969.

A more recent method of using conductivity changes to measure the concentration of a substrate in an enzyme-substrate reaction is disclosed in U.S. Pat. No. 3,635,681 issued to Rogers on Jan. 18, 1972. That method is based on the use of "differential conductivity" measurements. Whereas past conductivity measurements required only one set of electrodes to measure the conductivity of an ionic solution, differential conductivity measurements require the use of two sets of electrodes such that the difference in conductivity between a reaction medium and a "standard" medium can be used to determine concentrations. Differential conductivity measurements permit the subtraction of background conductivity in an ionic medium containing the substance to be detected from the measured change in conductivity caused by a chemical reaction between an enzyme and a substrate to be detected or measured. In the above patent, there is disclosed a differential conductivity apparatus having two sets of electrodes or two probes, each having a set of electrodes. One such probe has associated therewith and between each of the electrodes a matrix means containing a "test reagent" such as an enzyme fixed to or immobilized on or within the matrix. In using such a probe, the enzyme is not kept separate from the ionic medium wherein the conductivity is being measured.

I have now found that differential conductivity can be used to measure minute changes in the electrical conductivity of a solution containing the products of glucose-glucose oxidase reaction without the necessity of having the enzyme present in the medium containing the reaction products. My apparatus is relatively simple to prepare and use and does not require the use of any specially prepared probes. The apparatus and method for using it are described in detail herein.

SUMMARY OF THE INVENTION

My apparatus for continuously monitoring the electrical conductivity of a solution containing the reaction products of a glucose-glucose oxidase reaction comprises, in combination, first and second flow-through conductivity cells, each cell having a chamber through which an ionic solution can flow and a pair of electrodes exposed to the chamber and adapted to measure the electrical conductivity of an ionic solution within the chamber; a flow-through container such as a plug flowthrough column containing composites of glucose oxidase and catalase immobilized within the pores of porous, essentially water-insoluble inorganic carrier particles having an average pore diameter between about 220A and 985A and an average particle size between about 25 and 80 mesh, U.S. Standard Sieve; means for introducing a glucose-containing solution into the container and means for collecting the solution after passage through the container and passing the collected solution through the first flow-through conductivity cell; means for measuring the electrical conductivity of a solution within the first cell; means for passing either a standard glucose solution (e.g., 6 percent by weight glucose in water) or the glucose solution prior to passage through the flow-through container through the second cell and means for measuring the electrical conductivity of either such solution within the second cell; and means for measuring the difference in electrical conductivities of solutions within the first and second cells. In a preferred embodiment, the flow-through container is a plug flow-through glass column containing composites of glucose oxidase and catalase adsorbed within particles or porous titania carriers having an average pore diameter between about 220A and 400A and there is included a recorder electrically associated with the means for determining the differential conductivity of the contents of the first and second conductivity cells.

SPECIFIC EMBODIMENTS

A very important part of my apparatus for continuously monitoring changes in the conductivity of a solution containing the reaction products of a glucose-glucose oxidase reaction is the flow-through container and the immobilized glucose oxidase and catalase contained therein. The immobilized enzyme composites are made in accordance with the directions in my copending patent application Ser. No. 332,804 filed on Feb. 16, 1973, entitled "Synergistic Enzymes Adsorbed Within Porous Inorganic Carriers," and assigned to the present assignee. In that disclosure, incorporated herein by reference, it is pointed out that an extremely stable immobilized glucose oxidase composite can be prepared by immobilizing glucose oxidase and catalase within the pores of essentially water-insoluble inorganic carrier materials having an average pore diameter between about 220A and 985A. As used herein, the term immobilized, or its equivalent, when applied to enzymes, refers to enzymes which have been bonded to the inorganic carrier surfaces in such a way that the enzymes retain their catalytic ability even though insoluble. Such enzymes can be immobilized by adsorption (U.S. Pat. No. 3,556,945), by covalent bonds (U.S. Pat. No. 3,519,538), and other means.

Glucose oxidase oxidizes glucose to form gluconic acid and hydrogen peroxide. However, as pointed out in the above application, the continuing presence of hydrogen peroxide tends to oxidize the enzyme. Thus, by having catalase present within the pores along with the glucose oxidase, the hydrogen peroxide is broken down to yield oxygen. Since oxygen is continuously needed by the glucose oxidase to oxidize glucose the two enzymes cooperate in the overall oxidation of glucose.

In the above application, it was shown that the average pore diameter of the porous inorganic carrier is very important for long term enzyme stability and high enzyme loading. Specifically, it was found that the average pore diameter should be at least as large as the larger catalase molecule but less than about 1,000A. A very preferred carrier material for the immobilized glucose oxidase and catalyase was porous titania particles of about 25 to 80 mesh having an average pore diameter of between about 220A and 985A. An especially preferred carrier consisted of porous titania particles of 25-60 mesh and an average pore diameter of 220A-400A. The above-described preferred carrier was found especially useful in the example below although it should be appreciated that any of the carriers described in Ser. No. 332,804 as useful for a glucose oxidase-catalase composite would also be useful.

Figure 1:
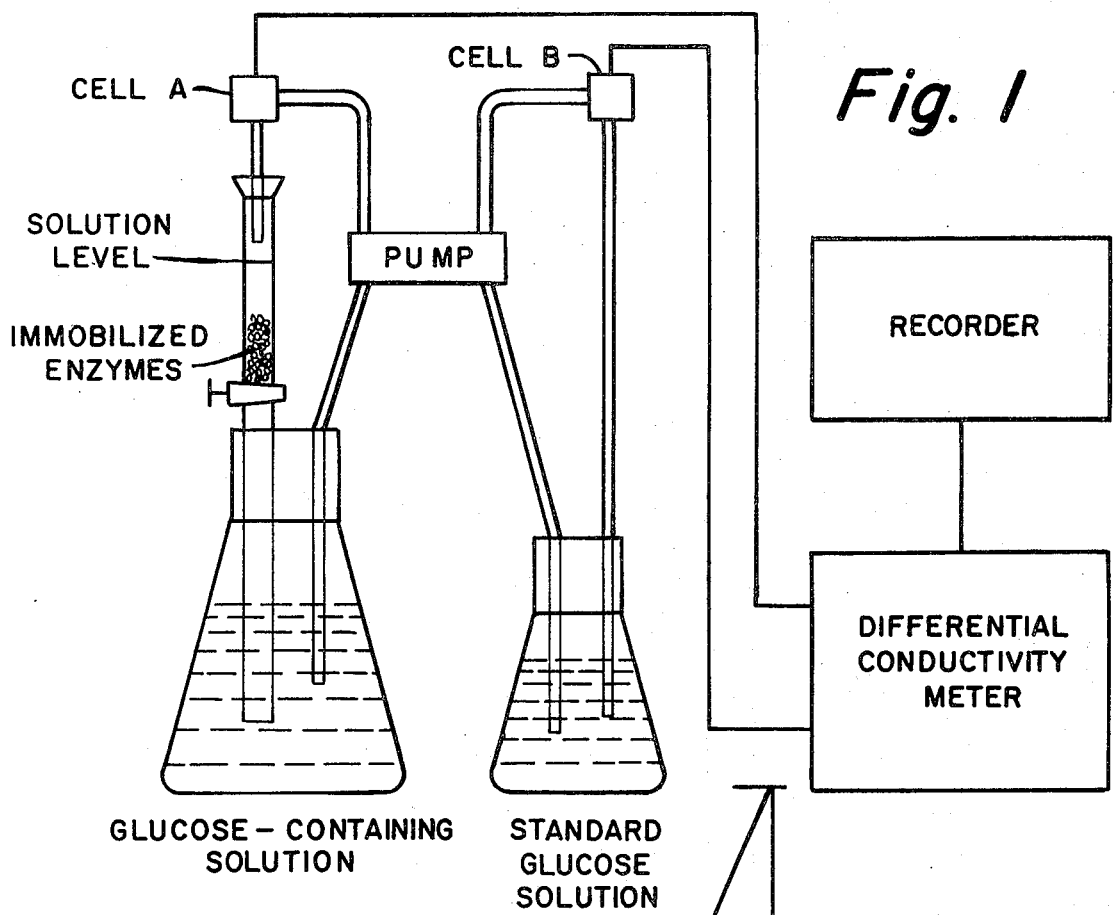
FIG. 1 is an illustrative diagram of the measuring apparatus in a preferred embodiment.

An illustrative diagram of the apparatus is shown in FIG. 1. There, it can be seen that a glucose-containing solution can be continuously pumped from a flask and through a glass plug flow-through column containing the immobilized enzyme composite consisting of glucose oxidase and catalase immobilized within the pores of porous inorganic carrier materials. The carrier should, of course, be essentially water-insoluble. In the specific apparatus described by FIG. 1, the conductivity of the solution after passage through the column is measured by cell A which is a simple flow-through container having two electrodes electrically connected to a differential conductivity meter. Also connected to the differential conductivity meter is a second cell, cell B, also having two electrodes, which measures the conductivity of a standard glucose solution which is also continuously pumped through the conductivity cell. The differential conductivity meter indicates the conductivity change in the glucose-containing solution (also containing reaction products) relative to the conductivity of the standard solution and this change can be continuously recorded on a conventional recorder as illustrated. These recordings can be used to determine the concentration of the glucose-containing solution or the enzyme activity via standard curves prepared beforehand. The pumps shown in FIG. 1 (illustrated very generally by the designation "pump") can be conventional peristaltically functional pumps. The pumps themselves, however, are not absolutely necessary since the glucose solution can be gravity-fed through the column and the conductivity change attributable to one pass through the column recorded, if desired.

Figure 2:
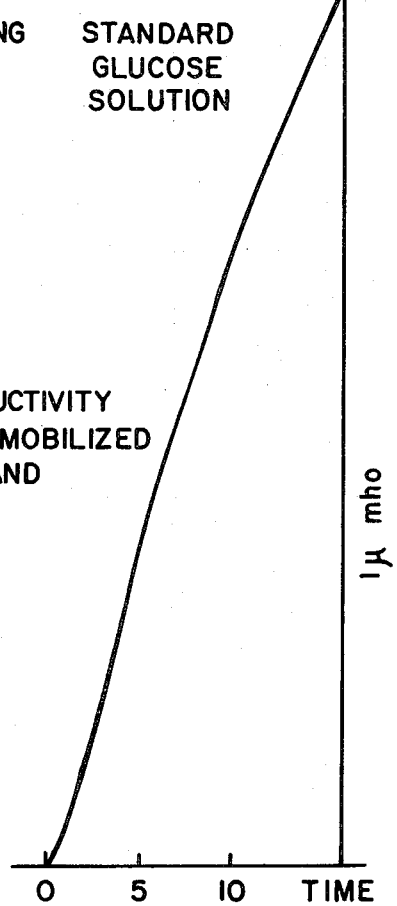
FIG. 2 is a graph showing a typical differential conductivity recording of the conductivity changes of the reaction product solution with time.

FIG. 2 shows a typical differential conductivity recording developed by continuously passing the glucose-containing solution described below through a glass flow-through plugged column (described below) containing composites of glucose oxidase and catalase adsorbed within the pores of porous titania particles (25–60 mesh) having an average pore diameter of about 350A. The actual preparation of the preferred composite is described below.

Preparation and Use of Apparatus

Materials and Methods

The glucose oxidase-catalase was a standardized preparation (which is sold under the name of DeeO liquid) available from the Marshall Division of Miles Laboratories, Inc. This preparation contained 750 glucose oxidase units (GOU) per ml and 225 EU of catalase per ml. The differential conductivity meter was a Wescan Instruments, Inc. Model 211. Conductivity flow cells, illustrated as cells A and B in FIG. 1, were Model 219-020 conductivity flow cells, having a cell constant $K = 80$ and they were obtained from Wescan Instruments, Inc. A fourchannel peristaltic pump was fitted with one-sixteenth inch I.D. Tygon tubing in two channels. The column used for the apparatus was a Corning Glass Works Code 442802 Teflon stopper, straight-bore stopcock, fitted with a fiber glass retainer just above the stopcock fittings. The O.D. of this column was 9 mm. The column length was approximately 11 cm. The Recorder illustrated in FIG. 1 was a Sargent Recorder, Model SRL.

Preparation of the Enzyme

A 20 ml volume of DeeO liquid was dialyzed against four 3,500 ml charges of distilled water in a 4 liter beaker stirring at room temperature over a two-hour period. The final volume of the dialyzed enzyme solution was measured. The solution was centrifuged at 2,200 rpm for 15 minutes at room temperature. The insoluble particles were discarded and the enzyme activity was estimated.

Preparation of the Carriers

My preferred carrier had the following characteristics:

TABLE I

| | $TiO_2$ |
|---|---|
| Ave Pore Diam (A) | 350 |
| Min Pore Diam (A) | 220 |
| Max Pore Diam (A) | 400 |
| Pore Volume ($cm^3/g$) | 0.45 |
| Surface Area ($m^2/g$) | 48 |
| Particle Mesh Size | 25–60 |

A 300 mg quantity of the porous carrier was transferred to a 10 ml cylinder. A 9 ml volume of 0.5 M sodium bicarbonate was added to precondition the carrier surface. The cylinder was then placed in a shaking water bath at 35°C. After being shaken in the bath for 3 hours, the cylinder was removed from the bath, the bicarbonate solution was decanted, and 9 ml of water was added to the cylinder. The cylinder was stoppered and inverted several times and the water wash was decanted. At this point the carrier was ready for the adsorption and immobilization of the enzymes.

Enzyme Immobilization

The immobilization of the enzymes was performed in a 25 ml Erlenmeyer flask. A volume of dialyzed glucose-oxidase-catalase solution (containing 4,500 GOU) was added to the 300 mg of preconditioned porous titania carrier. The vessel was then placed in a shaking water bath at 35°C and reacted with shaking for about 2 hours and 20 minutes. The vessel was then removed from the bath and the adsorption and diffusion was allowed to continue overnight (approximately 15 hours) at room temperature without shaking. The enzyme solution was decanted and the immobilized enzyme system was washed several times as follows: The first wash, 9 ml of distilled water, was added to the vessel. The vessel was stoppered and inverted several times to mix thoroughly.

The wash was then decanted. The second wash, performed as above, contained 9 ml of 0.5 M sodium chloride; the third wash was a 9 ml volume of 0.2 M acetate buffer, pH 6.1, and the final wash was 9 ml of distilled water.

The immobilized enzyme system was then transferred with distilled water to the stopcock column previously described. The immobilized enzymes were stored between messurements at room temperature in the columns filled with distilled water and stoppered with a cork stopper.

Assay Procedure

The specific differential conductivity measurement conditions were as follows:

Temperature: 22°C (room temperature)
Standard Solution: 6 percent glucose by wt. in water containing hydrogen peroxide, (0.0045 percent), pH 5.7–6.4 (unbuffered).
Volume of Standard 6 percent Glucose solution: 25 ml
Volume of reaction mixture: 6 percent Glucose by wt. in water — 100 ml
Flow Rate: Two standard conditions were employed — 145 ml per hour and 390 ml per hour.

The column conductivity measurements were performed using a 125 ml Erlenmeyer flask containing the 100 ml of glucose substrate solution with a magnetic stirring bar. This flask was mounted on a magnetic stirrer and stirring was commenced. The inlet (the column outlet) and outlet tubes were inserted below the surface of the substrate solution and circulation was initiated by turning on the pump. The meter and recorder were then balanced and, after a stable base line was achieved, the outlet tubing from the flow-through cell A was inserted into the top of the column containing the immobilized enzymes. The stopcock on the flow-through column was adjusted to maintain a three-fourths inch head of glucose-containing solution above the immobilized enzyme as the substrate solution circulated through the column and back into the reaction flask (See "solution level" of FIG. 1). This circulation was maintained throughout the assay. (See FIG. 1).

Assay Results

The results were obtained from the initial slopes of the differential conductivity recording which were than multiplied by the cell constant 80, corrected for dilution by multiplying by four (100 ml of substrate was used in place of the 25 ml calibration quantity), correlated to GOU by dividing by 2.65 and finally reduced to a per-gram base by multiplying by 3.33. A typical recording of the immobilized enzyme reaction may be seen in FIG. 2. It should be noted that in this recording there is no contribution to conductivity by the enzyme itself during the initial minute as has been observed in the past for the free enzyme.

Effect of Flow Rate on Apparent Glucose Oxidase Activity

TABLE II

The apparent activity of the enzyme composite was affected by flow rate through the column as shown by the data below.

| Flow Rate (ml per hour) | Apparent Activity (GOU per gram) |
|---|---|
| 125 | 30.2 |
| 182 | 46.3 |
| 235 | 52.4 |
| 280 | 60.3 |
| 390 | 66.4 |

It should be noted that increases in flow rate (Table II) result in increases in the apparent activity of the immobilized glucose oxidase-catalase. Since the diffusion of the glucose substrate molecule possibly plays a part in the apparent activity of the immobilized enzymes, then anything that would increase the diffusion rate of the glucose should increase the apparent activity of the preparation. Increasing flow rates of the substrate solution not only removes the reaction products from the pores but renews the concentration of glucose at the surface of the carrier, thus increasing the diffusion of the glucose. The effect of flow rates upon the enzymes immobilized in carrier having other pore sizes was observed. In all systems studies, flow rate increases above 350 ml per hour have little or no effect on increasing the apparent activity.

Enzyme composites consisting of glucose oxidase and catalase immobilized by covalent bonds through intermediate silane coupling agents to porous inorganic carrier of the type described were also used in the column of FIG. 1 with substantially equivalent results.

Inasmuch as the described apparatus is subject to various modifications that will become apparent to those skilled in the art, it is intended that the scope of the described invention should be limited only by the appended claims.

I claim:

1. An apparatus for monitoring the electrical conductivity of a solution containing the products of a glucose-glucose oxidase reaction comprising in combination:

a. first and second flow-through cells, each cell having a chamber through which an ionic solution can flow and a pair of electrodes exposed to the chamber and adapted to measure the electrical conductivity of an ionic solution within the chamber;

b. a flow-through container containing an enzyme composite comprising glucose oxidase and catalase immobilized within the pores of porous, essentially water-insoluble inorganic carrier particles having an average pore diameter between about 220A and 985A and an average particle size between about 25 and 80 mesh, U.S. Standard Sieve;

c. means for introducing a glucose-containing solution into the container of (b) and means for collecting the solution after passage through the container of (b) and passing the collected solution through the first flowthrough cell;

d. means for measuring the electrical conductivity of a solution within the first cell;

e. means for passing either a standard glucose solution or the glucose-containing solution prior to passage through the container of (b) through the second cell and measuring the electrical conductivity of either such solutions within the second cell; and, f. means for measuring the difference in electrical conductivity between the first and second cell.

2. The apparatus of claim 1 wherein the container of (b) is a plug flow-through column containing enzyme composite of glucose oxidase and catalase adsorbed within the pores of porous titania particles having an average pore diameter between about 220A and 400A.

3. The apparatus of claim 1 wherein there is included recorder means electrically associated with the means for measuring the difference in conductivity between the first and second cells.

4. A method of monitoring the change in electrical conductivity of a solution which change is attributable to a glucose-glucose oxidase reaction which comprises the steps of:
   a. passing a glucose-containing solution through a flow-through container containing composites of glucose oxidase and catalase immobilized within the pores of porous, essentially water-insoluble inorganic carrier particles having an average pore diameter between about 220A and 985A and an average particle size between about 25 and 80 mesh, U.S. Standard Sieve;
   b. measuring the electrical conductivity of the solution after passage through the container; and
   c. determining the difference between that conductivity and that of a standard glucose solution or the conductivity of the glucose-containing solution prior to passage through the flow-through container.

5. The method of claim 4 wherein the flow-through container is a plug flow-through column containing composites of glucose oxidase and catalase adsorbed within the pores of porous titania particles having an average pore diameter of between about 220A and 400A.

* * * * *